United States Patent
Buske et al.

(10) Patent No.: US 7,828,089 B2
(45) Date of Patent: Nov. 9, 2010

(54) EROSION RESISTANT FLUID PASSAGEWAYS AND FLOW TUBES FOR EARTH-BORING TOOLS, METHODS OF FORMING THE SAME AND EARTH-BORING TOOLS INCLUDING THE SAME

(75) Inventors: Robert J. Buske, The Woodlands, TX (US); James R. Florey, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 231 days.

(21) Appl. No.: 11/957,207

(22) Filed: Dec. 14, 2007

(65) Prior Publication Data

US 2009/0152013 A1    Jun. 18, 2009

(51) Int. Cl.
*E21B 10/60*    (2006.01)
*B21K 5/02*    (2006.01)
(52) U.S. Cl. .................. 175/393; 175/340; 76/108.2
(58) Field of Classification Search ............ 175/340, 175/393, 339; 76/108.2; 239/602, DIG. 19
See application file for complete search history.

(56) References Cited

U.S. PATENT DOCUMENTS

| | | | |
|---|---|---|---|
| 3,800,891 A | 4/1974 | White et al. | |
| 3,989,554 A | 11/1976 | Wisler | |
| 4,228,214 A | 10/1980 | Steigelman et al. | |
| 4,228,339 A | 10/1980 | Scales et al. | |
| 4,243,727 A | 1/1981 | Wisler et al. | |
| 4,431,465 A | 2/1984 | Mizuhara et al. | |
| 4,448,270 A | 5/1984 | Buske | |
| 4,516,642 A | 5/1985 | Childers et al. | |
| 4,546,837 A | 10/1985 | Childers et al. | |
| 4,558,754 A | 12/1985 | Childers et al. | |
| 4,582,149 A | 4/1986 | Slaughter, Jr. | |
| 4,685,359 A | 8/1987 | Worthen et al. | |
| 4,724,911 A | 2/1988 | Buske | |
| 4,726,432 A | 2/1988 | Scott et al. | |

(Continued)

FOREIGN PATENT DOCUMENTS

WO    2005052210 A1    6/2005

(Continued)

OTHER PUBLICATIONS

PCT International Search Report for International Application No. PCT/US2008/086394, mailed Jul. 23, 2009.

(Continued)

*Primary Examiner*—David J Bagnell
*Assistant Examiner*—Catherine Loikith
(74) *Attorney, Agent, or Firm*—TraskBritt (57) ABSTRACT

Flow tubes for earth-boring tools include hardfacing material for protecting the tubes from erosion due to the flow of fluid through a fluid passageway extending therethrough. Earth-boring tools include an erosion-resistant material covering a surface of a body of the tools for protecting the bodies from erosion due to the flow of fluid through a fluid passageway extending therethrough. Methods of forming earth-boring tools include forming a body having a fluid passageway extending therethrough and covering a surface of the body with a hardfacing material. The surface of the body may be located in a region susceptible to erosion when fluid is caused to flow through the fluid passageway.

25 Claims, 6 Drawing Sheets

U.S. PATENT DOCUMENTS

| | | | |
|---|---|---|---|
| 4,741,406 A | 5/1988 | Deane et al. | |
| 4,759,415 A | 7/1988 | Pessier | |
| 4,776,412 A | 10/1988 | Thompson | |
| 4,794,995 A | 1/1989 | Matson et al. | |
| 4,848,476 A | 7/1989 | Deane et al. | |
| 4,884,477 A | 12/1989 | Smith et al. | |
| 4,919,013 A | 4/1990 | Smith et al. | |
| 4,989,680 A | 2/1991 | Deane et al. | |
| 5,029,656 A | 7/1991 | Ivie et al. | |
| 5,038,640 A | 8/1991 | Sullivan et al. | |
| 5,072,796 A | 12/1991 | Shen et al. | |
| 5,096,005 A | 3/1992 | Ivie et al. | |
| 5,267,600 A | 12/1993 | Revankar | |
| 5,335,738 A | 8/1994 | Waldenstrom et al. | |
| 5,492,186 A | 2/1996 | Overstreet et al. | |
| 5,508,334 A | 4/1996 | Chen | |
| 5,663,512 A | 9/1997 | Schader et al. | |
| 5,669,459 A | 9/1997 | Larsen et al. | |
| 5,676,214 A | 10/1997 | Pearce et al. | |
| 5,829,539 A | 11/1998 | Newton et al. | |
| 5,853,055 A | 12/1998 | Siracki et al. | |
| 5,879,743 A | 3/1999 | Revankar | |
| 5,944,128 A | 8/1999 | Truax et al. | |
| 5,952,042 A | 9/1999 | Rafferty et al. | |
| 6,029,759 A * | 2/2000 | Sue et al. | 175/374 |
| 6,098,728 A | 8/2000 | Wells et al. | |
| 6,098,730 A | 8/2000 | Scott et al. | |
| 6,206,115 B1 | 3/2001 | Overstreet et al. | |
| RE37,127 E | 4/2001 | Schader et al. | |
| 6,248,149 B1 | 6/2001 | Massey et al. | |
| 6,253,862 B1 | 7/2001 | Overstreet et al. | |
| 6,354,387 B1 | 3/2002 | Harris et al. | |
| 6,360,832 B1 | 3/2002 | Overstreet et al. | |
| 6,436,470 B1 | 8/2002 | Iacocca et al. | |
| 6,571,887 B1 | 6/2003 | Nguyen et al. | |
| 6,649,682 B1 | 11/2003 | Breton et al. | |
| 6,651,756 B1 | 11/2003 | Costo, Jr. et al. | |
| 6,763,902 B2 | 7/2004 | Larsen et al. | |
| 6,766,870 B2 | 7/2004 | Overstreet | |
| 6,772,849 B2 | 8/2004 | Oldham et al. | |
| 7,213,661 B2 | 5/2007 | Larsen et al. | |
| 7,237,628 B2 | 7/2007 | Desai et al. | |
| 7,240,746 B2 | 7/2007 | Overstreet et al. | |
| 7,252,164 B2 | 8/2007 | Hossain et al. | |
| 7,303,030 B2 | 12/2007 | Lockwood et al. | |
| 7,337,941 B2 | 3/2008 | Scott et al. | |
| 7,343,990 B2 | 3/2008 | Pessier et al. | |
| 7,361,411 B2 | 4/2008 | Daeman et al. | |
| 2007/0000698 A1 | 1/2007 | Viswanadham | |
| 2007/0017160 A1 | 1/2007 | Caldwell et al. | |
| 2007/0079992 A1 | 4/2007 | Curry et al. | |
| 2007/0163812 A1 | 7/2007 | Overstreet et al. | |
| 2007/0227781 A1 | 10/2007 | Cepeda et al. | |

FOREIGN PATENT DOCUMENTS

| | | |
|---|---|---|
| WO | 2007/059267 A1 | 5/2007 |
| WO | 2008/042330 A1 | 4/2008 |
| WO | 2008/079285 A1 | 7/2008 |

OTHER PUBLICATIONS

Juliot, Chad, et al., "Erosion Resistance of Infiltration Brazed Tungsten Carbide Cladding," Conforma Clad, New Albany, IN, 9 pages, no date.

* cited by examiner

EROSION RESISTANT FLUID PASSAGEWAYS AND FLOW TUBES FOR EARTH-BORING TOOLS, METHODS OF FORMING THE SAME AND EARTH-BORING TOOLS INCLUDING THE SAME

FIELD OF THE INVENTION

The present invention relates generally to earth-boring tools, components of earth-boring tools, and methods of forming earth-boring tools and components thereof. More particularly, the present invention relates to earth-boring tools and components thereof that are relatively resistant to erosion caused by the flow of fluid through fluid passageways extending through the earth-boring tools and components thereof, to methods of forming such earth-boring tools and components, and methods of improving the erosion resistance of such tools and components.

BACKGROUND OF THE INVENTION

Earth-boring tools are commonly used for forming (e.g., drilling and reaming) bore holes or wells (hereinafter "wellbores") in earth formations. Earth-boring tools include, for example, rotary drill bits, core bits, eccentric bits, bicenter bits, reamers, underreamers, and mills.

Earth-boring rotary drill bits have two primary configurations. One configuration is the roller cone bit, which typically includes three cones mounted on supporting bit legs that extend from a bit body, which may be formed from, for example, three bit head sections that are welded together to form the bit body. Each bit leg may depend from one bit head section. Each roller cone is configured to spin or rotate on a bearing shaft that extends from a bit leg in a radially inward and downward direction from the bit leg. The cones are typically formed from steel, but they also may be formed from a particle-matrix composite material (e.g., a cement composite such as cemented tungsten carbide). Cutting teeth for cutting rock and other earth formations may be machined or otherwise formed in or on the outer surfaces of each cone. Alternatively, receptacles are formed in outer surfaces of each cone, and inserts formed of hard, wear resistant material are secured within the receptacles to form the cutting elements of the cones.

The roller cone drill bit may be placed in a bore hole such that the cones are adjacent the earth formation to be drilled. As the drill bit is rotated, the roller cones roll and slide across the surface of the formation, which causes the cutting teeth to crush and scrape away the underlying formation.

It is known in the art to apply wear-resistant materials, such as "hardfacing" materials, to the formation-engaging surfaces of rotary drill bits to minimize wear of those surfaces of the drill bits caused by abrasion. For example, abrasion occurs at the formation-engaging surfaces of an earth-boring tool when those surfaces are engaged with and sliding relative to the surfaces of a subterranean formation in the presence of the solid particulate material (e.g., formation cuttings and detritus) carried by conventional drilling fluid. For example, hardfacing may be applied to cutting teeth on the cones of roller cone bits, as well as to the gage surfaces of the cones. Hardfacing also may be applied to the exterior surfaces of the curved lower end or "shirttail" of each bit leg, and other exterior surfaces of the drill bit that are likely to engage a formation surface during drilling.

During drilling, drilling fluid is pumped down the wellbore through the drill string to the drill bit. The drilling fluid passes through an internal longitudinal bore within the drill bit and through other fluid conduits or passageways within the drill bit to nozzles that direct the drilling fluid out from the drill bit at relatively high velocity. The nozzles may be directed toward the cones and cutting elements thereon to clean debris and detritus from the cones and prevent "balling" of the drill bit. The nozzles also may be directed past the cones and toward the bottom of the wellbore to flush debris and detritus off from the bottom of the wellbore and up the annulus between the drill string and the casing (or exposed surfaces of the formation) within the wellbore, which may improve the mechanical efficiency of the drill bit and the rate of penetration (ROP) of the drill bit into the formation.

It is known in the art to use flow tubes to direct drilling fluid to a nozzle and out from the drill bit, particularly when it is desired to direct drilling fluid past the cones and toward the bottom of the wellbore. Such flow tubes may be separately formed from the bit body, and may be attached to the bit body (e.g., bit head section or bit leg) by, for example, welding the flow tubes to the bit body. A fluid course or passageway is formed through the bit body to provide fluid communication between the interior longitudinal bore of the drill bit and the fluid passageway within the flow tube.

As drilling fluid is caused to flow through the flow tube, the drilling fluid erodes away the interior surfaces of the flow tube. Such erosion may be relatively more severe at locations within the flow tube at which the direction of fluid flow changes, since the drilling fluid impinges on the interior surfaces of the flow tube at relatively higher angles at such locations. This erosion can eventually result in the formation of holes that extend completely through the walls of the flow tube, thereby allowing drilling fluid to exit the flow tube before passing through the nozzle, which eventually leads to failure of the designed hydraulic system of the drill bit. When the hydraulic system of the drill bit fails, the rate of penetration decreases and the drill bit becomes more susceptible to "balling." Ultimately, the drill bit may fail and need to be replaced.

In view of the above, there is a need in the art for fluid passageways and flow tubes for earth-boring tools and components thereof that are relatively more resistant to erosion, for methods of forming such earth-boring tools and components, and for methods of increasing the erosion resistance of fluid passageways and flow tubes of earth-boring tools and components.

BRIEF SUMMARY OF THE INVENTION

In some embodiments, the present invention includes flow tubes and other structures carrying fluid passageways for earth-boring tools that include hardfacing materials for protecting the flow tubes from erosion caused by the flow of fluid through fluid passageways extending through the flow tubes. In some embodiments, the hardfacing material covers at least a portion of an inner surface of a body within a fluid passageway. In other embodiments, the hardfacing material may be applied to an outer surface of the body, and may be disposed at least partially within a recess formed in the outer surface of the body.

In additional embodiments, the present invention includes earth-boring tools that include a hardfacing material for protecting a body thereof from erosion caused by the flow of fluid through a fluid passageway extending through the body. In some embodiments, at least a portion of the erosion-resistant material covers an inner surface of a body within a fluid passageway. In additional embodiments, at least a portion of the erosion-resistant material covers an outer surface of a body, and optionally may be at least partially disposed within a groove formed in the outer surface of the body.

In still other embodiments, the present invention includes methods of forming earth-boring tools. The methods include covering at least a portion of a surface of a body of an earth-boring with a hardfacing material. The surface may be located in a region susceptible to erosion caused by the flow of fluid through a fluid passageway extending through the body.

BRIEF DESCRIPTION OF THE SEVERAL VIEWS OF THE DRAWINGS

While the specification concludes with claims particularly pointing out and distinctly claiming that which is regarded as the present invention, various features and advantages of this invention may be more readily ascertained from the following description of the invention when read in conjunction with the accompanying drawings, in which:

DETAILED DESCRIPTION OF THE INVENTION

As used herein, the term "abrasion" refers to a three body wear mechanism that includes two surfaces of solid materials sliding past one another with solid particulate material therebetween.

As used herein, the term "erosion" refers to a two body wear mechanism that occurs when solid particulate material, a fluid, or a fluid carrying solid particulate material impinges on a solid surface.

As used herein, the term "fluid" comprises substances consisting solely of liquids as well as substances comprising solid particulate material suspended within a liquid, and includes conventional drilling fluid (or drilling mud), which may comprise solid particulate material such as additives, as well as formation cuttings and detritus suspended within a liquid.

As used herein, the term "hardfacing" means any material or mass of material that is applied to a surface of a separately formed body and that is relatively more resistant to wear (abrasive wear and/or erosive wear) relative to the material of the separately formed body at the surface.

The illustrations presented herein are, in some instances, not actual views of any particular earth-boring tool, flow tube, or fluid passageway, but are merely idealized representations which are employed to describe the present invention. Additionally, elements common between figures may retain the same numerical designation.

Figure 1:
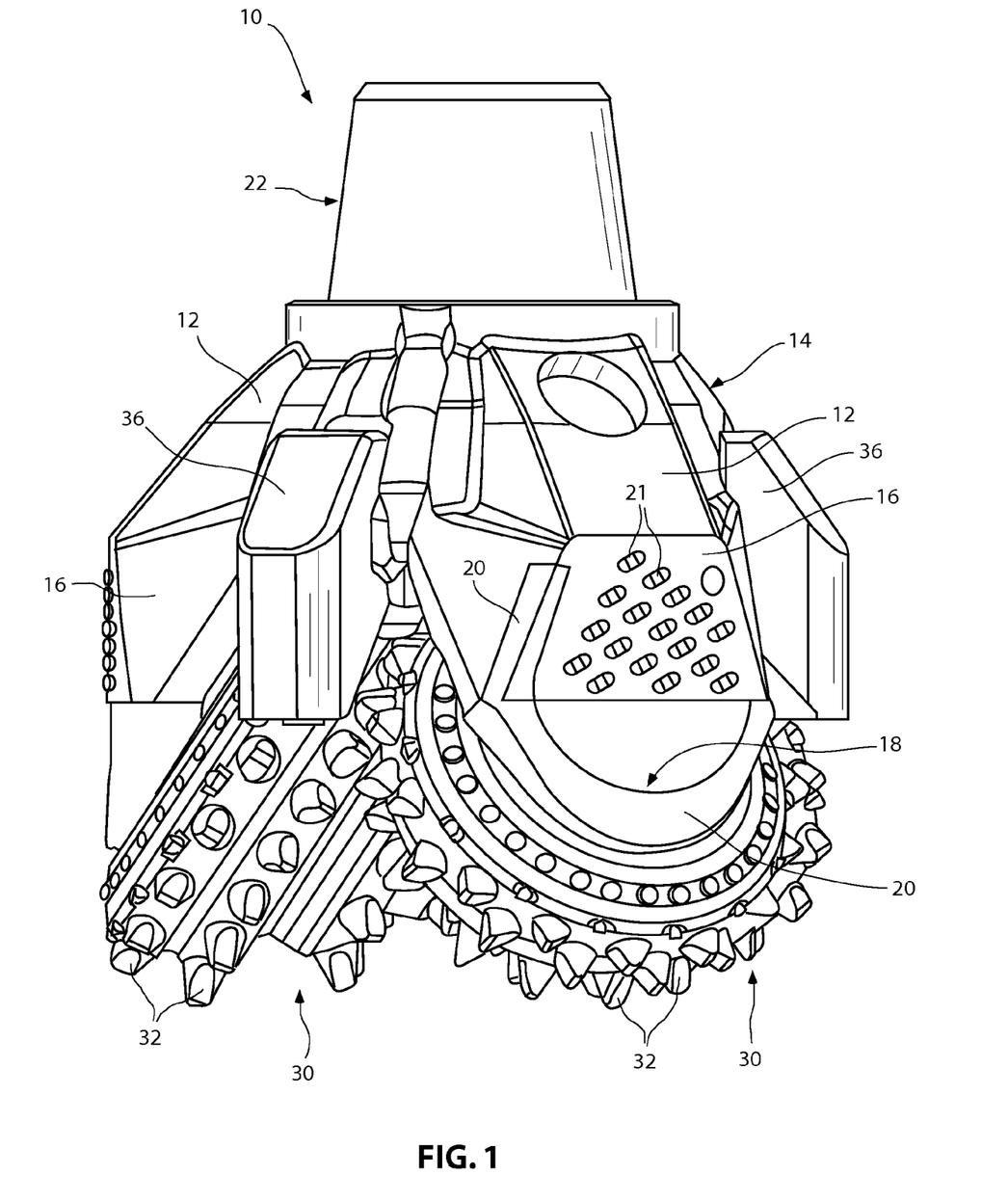
FIG. 1 illustrates an embodiment of an earth-boring rotary drill bit according to the present invention.

FIG. 1 is a perspective side view illustrating an embodiment of an earth-boring tool of the present invention. The earth-boring tool of FIG. 1 is a rolling cutter type rotary drill bit 10, such bits also being known in the art as "roller cone" bits as noted above, due to the generally conical shape of the rolling cutters employed in many such bits. The embodiment of the drill bit 10 shown in FIG. 1 includes three head sections 12 that are welded together to form a bit body 14 of the drill bit 10. Only two of the head sections 12 are visible in FIG. 1. The bit body 14 may comprise a pin 22 or other means for securing the drill bit 10 to a drill string or bottom hole assembly (not shown). In some embodiments, the pin 22 may be configured to conform to industry standards for threaded pin connections, such as those promulgated by the American Petroleum Institute (API).

A bit leg 16 extends downwardly from each of the head sections 12 of the drill bit 10. Each bit leg 16 may be integrally formed with the corresponding head section 12 from which it depends. As shown in FIG. 1, at least one of hardfacing material 20 and inserts 21 may be used to protect the outer surfaces of the bit legs 16 from wear. By way of example and not limitation, hardfacing material 20 may be applied to the rotationally leading surfaces of the bit legs 16 and to the lower surfaces or "shirttails" at the lower end 18 of the bit legs 16, and inserts 21 may be provided in or on the radially outward most surfaces of the bit legs 16, as shown in FIG. 1. The hardfacing material 20 and the inserts 21 may comprise materials that are relatively more wear-resistant relative to the material of the bit legs 16 at the surfaces thereof. In additional embodiments, the outer surfaces of the bit legs 16 may comprise only inserts 21 and no hardfacing 20, or only hardfacing 20 and no inserts 21. In yet further embodiments, the outer surfaces of the bit legs 16 may comprise neither hardfacing 20 nor inserts 21.

A rolling cutter in the form of a roller cone 30 may be rotatably mounted on a bearing shaft (not shown) that extends downward and radially inward from the lower end 18 of each bit leg 16 (relative to a longitudinal centerline (not shown) of the drill bit 10 and when the drill bit 10 is oriented relative to the observer as shown in FIG. 1). The roller cones 30 are rotatably mounted on the bearing shafts such that, as the drill bit 10 is rotated at the bottom of a wellbore within an earth formation, the roller cones 30 roll and slide across the underlying formation.

Each roller cone 30 includes a plurality of rows of cutting elements 32 for crushing and scraping the formation as the roller cones 30 roll and slide across the formation at the bottom of the wellbore. In the embodiment shown in FIG. 1, the cutting elements 32 comprise inserts that are pressed into complementary recesses formed in the body of the roller cones 30. The inserts may comprise a relatively hard and abrasive material such as, for example, cemented tungsten carbide. In additional embodiments, the cutting elements 32 may comprise cutting teeth that are machined on or in the surface of the roller cones 30. Such cutting teeth may be coated with hardfacing material (not shown), similar to the hardfacing material 20, which may comprise, for example, a composite material including hard particles (e.g., tungsten carbide) dispersed within a metal or metal alloy matrix material (e.g., an iron-based, cobalt-based, or nickel-based alloy).

With continued reference to FIG. 1, the drill bit 10 includes three flow tubes 36 (only two of which are visible in FIG. 1). In the embodiments shown in FIG. 1, the flow tubes 36 are discrete structures that are separately formed from the head sections 12 (and integral bit legs 16) of the drill bit 10. The flow tubes 36 are attached to the bit body 14 by, for example, welding the flow tubes 36 to the bit body 14 after welding the head sections 12 together to form the bit body 14. In other embodiments, the flow tubes 36 may be welded to one or more head sections 12 prior to welding the head sections 12 together to form the bit body 14. In yet further embodiments, the flow tubes 36 may not be separately formed from the head sections 12, but rather may be an integral part of a head section 12.

The drill bit 10 includes an internal longitudinal bore (not shown), which may also be termed a plenum, that extends at least partially through the pin 22. The internal longitudinal bore diverges into a plurality of fluid passageways that lead to the exterior of the drill bit 10. At least one of these fluid passageways leads to, and extends through, each of the flow tubes 36.

As previously discussed, during drilling, drilling fluid is pumped from the surface through the drill string (not shown) and the drill bit 10 to the bottom of the wellbore. The drilling fluid passes through the internal longitudinal bore and the fluid passageways (not shown) within the drill bit 10 and out from the flow tubes 36 toward the cones and/or the exposed surfaces of the subterranean formation within the wellbore. Nozzles (not shown) may be inserted within each of the flow tubes 36. The nozzles may have internal geometries designed and configured to at least partially define the velocity and the direction of the drilling fluid as the drilling fluid passes through the nozzles and exits the flow tubes 36.

Embodiments of drill bits and other earth-boring tools, such as the drill bit 10 shown in FIG. 1, include flow tubes 36 and/or fluid passageways that are relatively more resistant to erosion caused by the drilling fluid flowing through the flow tubes 36, as discussed in further detail below.

Figures 2A, 2B:
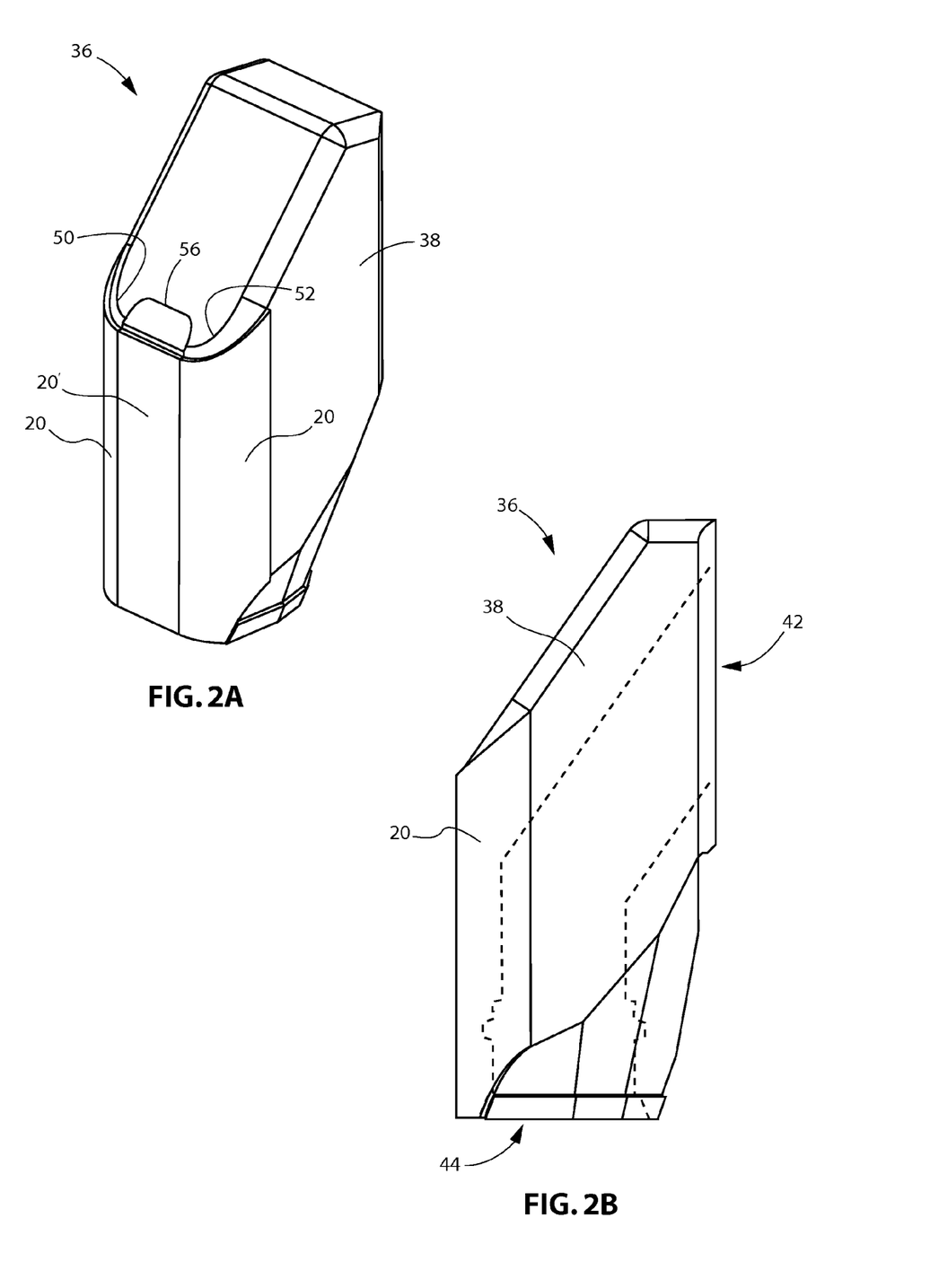
FIG. 2A is an isometric view of an embodiment of a flow tube according to the present invention that may be used with earth-boring tools, such as the rotary drill bit shown in FIG. 1.
FIG. 2B is a side view of the flow tube shown in FIG. 2A.
Figures 2C, 2D:
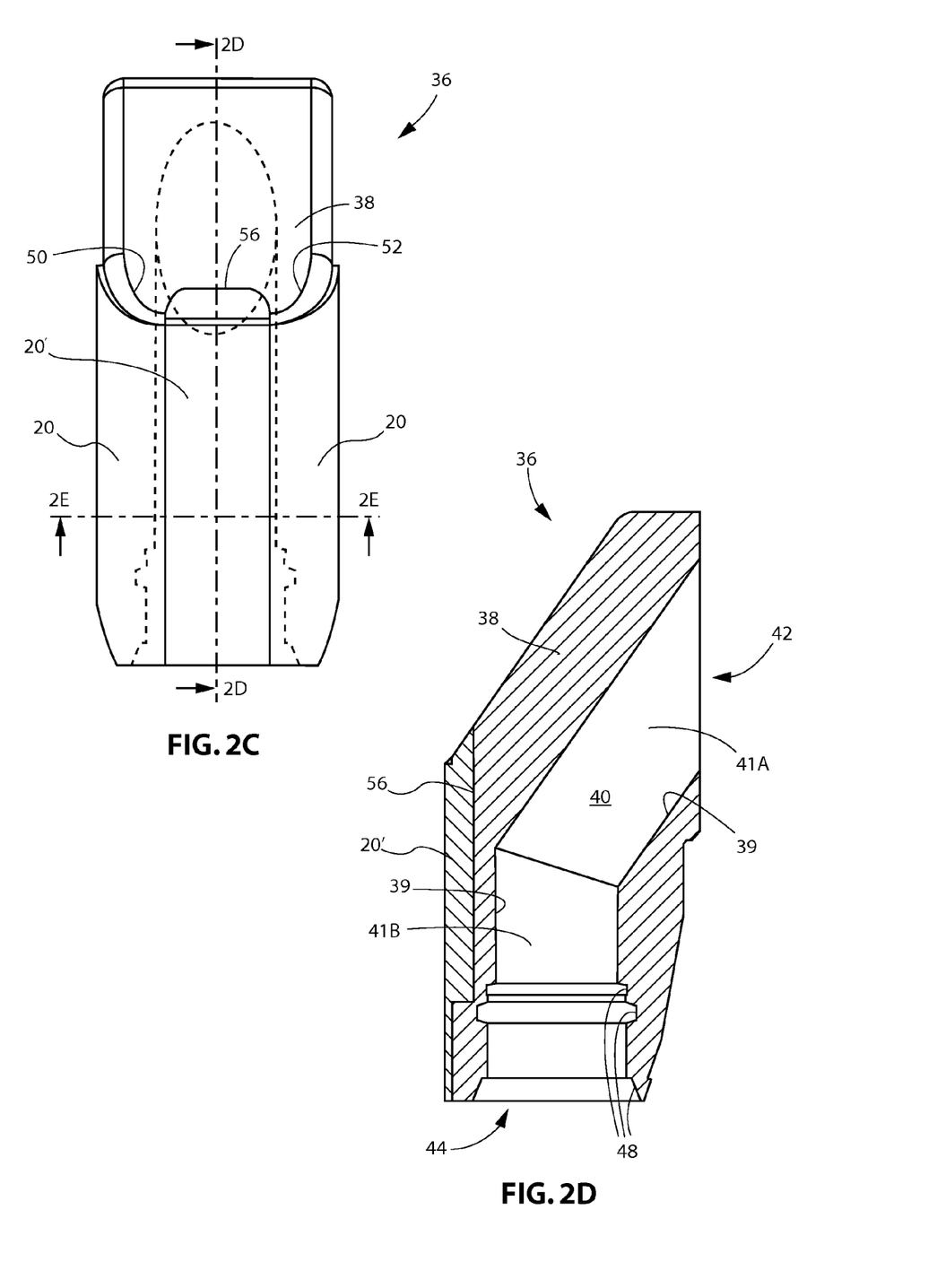
FIG. 2C is a front view of the flow tube shown in FIGS. 2A and 2B.
FIG. 2D is a longitudinal cross-sectional view of the flow tube shown in FIGS. 2A-2D taken along section line 2D-2D shown in FIG. 2C.

FIGS. 2A-2F illustrate an example embodiment of a flow tube 36 of the present invention. FIG. 2A is an isometric view of the flow tube 36, FIG. 2B is a side view of the flow tube 36, and FIG. 2C is a front view of the flow tube 36.

Referring to FIG. 2A, the flow tube 36 includes a tube body 38, which may comprise a metal or metal alloy such as, for example, steel. As shown in FIG. 2D, which is a longitudinal cross-sectional view of the flow tube 36 taken along section line 2D-2D shown in FIG. 2C, a fluid passageway 40 extends through the tube body 38 of the flow tube 36 from an inlet 42 to an outlet 44. Drilling fluid flows through the fluid passageway 40 from the inlet 42 to the outlet 44 during drilling. Annular recesses 48 or other geometric features (e.g., threads) may be machined or otherwise provided in the inner walls 39 of the tube body 38 within the fluid passageway 40 proximate the outlet 44 to receive and secure a nozzle and any associated seals (e.g., o-rings) and retention rings therein.

Referring again to FIG. 2A, hardfacing material 20 may be applied to one or both of the rotationally leading outer edge 50 and the rotationally trailing outer edge 52 of the tube body 38. Furthermore, hardfacing material 20 may be applied to exterior surfaces of the tube body 38 of the flow tube 36 over regions that are proximate to, or adjacent regions of the inner walls 39 of the tube body 38 that are susceptible to erosion caused by the flow of drilling fluid through the flow tube 36.

For purposes of this application, regions "susceptible to erosion" caused by the flow of drilling fluid through the flow tube or fluid passageway are those regions of a flow tube, drill bit, or other earth-boring tool that will eventually be eroded away by drilling fluid when conventional drilling fluid is caused to flow through the flow tube or fluid passageway at conventional drilling flow rates and fluid pressures for a period of time of less than about five times the average lifetime, in terms of operating hours, for the respective design or model of the drill bit or other earth-boring tool carrying the flow tube or fluid passageway. In other words, if conventional drilling fluid is caused to flow through the flow tube or fluid passageway at conventional flow rates and fluid pressures for a period of time that is about five times the average lifetime of the respective design or model of the drill bit or other earth-boring tool carrying the flow tube or fluid passageway, and a region of the flow tube, drill bit, or other earth-boring tool has eroded away, that region may be considered to be a region "susceptible to erosion" caused by the flow of drilling fluid through the flow tube or fluid passageway for purposes of this application.

Referring to FIG. 2D, a first section 41A of the fluid passageway 40 extends through the flow tube 36 in a first direction from the inlet 42 in a radially outward and downward direction (relative to a longitudinal centerline of the drill bit 10 when the flow tube 36 is secured to the drill bit 10 and the drill bit 10 is oriented relative to the observer as shown in FIG. 1). The first section 41A of the fluid passageway 40 transitions to a second section 41B of the fluid passageway 40 that extends in a generally downward direction to the outlet 44. In the embodiment shown in FIGS. 2A-2E, the first section 41A of the fluid passageway 40 is oriented at an obtuse angle (i.e., between 90° and 180°) relative to the second section 41B of the fluid passageway 40. In this configuration, as drilling fluid passes from the first section 41A into the second section 41B of the fluid passageway 40, the drilling fluid may impinge on the radially outward regions of the inner walls 39 of the tube body 38 within the second section 41B at an acute angle of less than ninety degrees (90°). As a result, the radially outward regions of the inner walls 39 of the tube body 38 within the second section 41B of the fluid passageway 40 may be more susceptible to erosion caused by the passage of drilling fluid through the fluid passageway 40 relative to other regions of the inner walls 39 of the tube body 38.

To reduce damage to the flow tube 36 caused by such erosion, a relatively thick layer of hardfacing 20' may be applied to the regions of the outer surfaces of the tube body 38 of the flow tube 36 that are adjacent the regions of the inner walls 39 of the tube body 38 that are susceptible to erosion as shown in FIGS. 2A-2E. The relatively thick layer of hardfacing 20' may be configured in the form of an elongated strip extending down and covering the radially outward most regions of the outer surfaces of the tube body 38 of the flow tube 36 (relative to the longitudinal centerline of the drill bit 10 (FIG. 1)), as best shown in FIGS. 2A and 2C.

In using the hardfacing 20' to reduce damage to the flow tube 36 caused by erosion of the inner walls 39 of the tube body 38, it may be desirable to configure the relatively thick layer of hardfacing 20' to have a thickness that is greater than a thickness of hardfacing 20 used to prevent or reduce abrasive wear to exterior surfaces of the flow tube 36, such as the hardfacing 20 applied to the rotationally leading and trailing outer edges 50, 52 of the flow tube 36. By way of example and not limitation, the relatively thick layer of hardfacing 20' may have an average thickness of greater than about 5.0 millimeters (greater than about 0.2 inch), and the hardfacing 20 applied to the rotationally leading and trailing outer edges 50, 52 of the flow tube 36 may have an average thickness of less than about 4.5 millimeters (less than about 0.18 inch). As one particular non-limiting example, the relatively thick layer of hardfacing 20' may have an average thickness of between about 6.9 millimeters (about 0.27 inch) and about 8.2 millimeters (about 0.32 inch), and the hardfacing 20 applied to the rotationally leading and trailing outer edges 50, 52 of the flow tube 36 may have an average thickness of between about 0.8 millimeter (about 0.03 inch) and about 1.6 millimeters (about 0.06 inch).

Figure 2E:
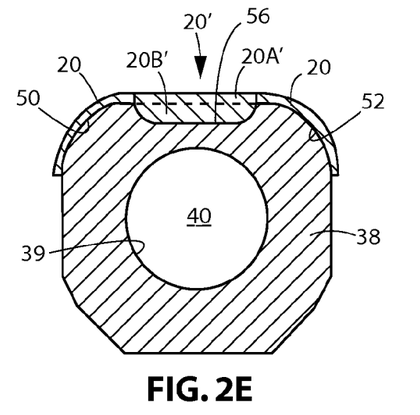
FIG. 2E is a transverse cross-sectional view of the flow tube shown in FIGS. 2A-2D taken along section line 2E-2E shown in FIG. 2C.

In some embodiments, it may be desirable to configure the exterior surface of the relatively thick layer of hardfacing 20' and the exterior surfaces of the hardfacing 20 applied to the rotationally leading and trailing outer edges 50, 52 of the flow tube 36 to be substantially flush with one another, as shown in FIG. 2A. To enable the exterior surface of the hardfacing 20' and the hardfacing 20 to be substantially flush with one another, the layer of hardfacing 20' may be at least partially disposed within a recess 56 provided in an outer surface of the tube body 38 of the flow tube, as shown in FIGS. 2A, 2C, 2D, and 2E. Referring to FIGS. 2D and 2E, in some embodiments, the recess 56 may be configured as a groove that extends in a downward direction along the outer surface of the tube body 38. As one non-limiting example, the recess 56 may extend into the outer surface of the tube body 38 to a depth of between about 5.0 millimeters (about 0.20 inch) and about 13.0 millimeters (about 0.50 inch). More particularly, the recess 56 may extend into the outer surface of the tube body 38 to a depth of between about 6.1 millimeters (about 0.24 inch) and about 6.6 millimeters (about 0.26 inch).

Figure 2F:
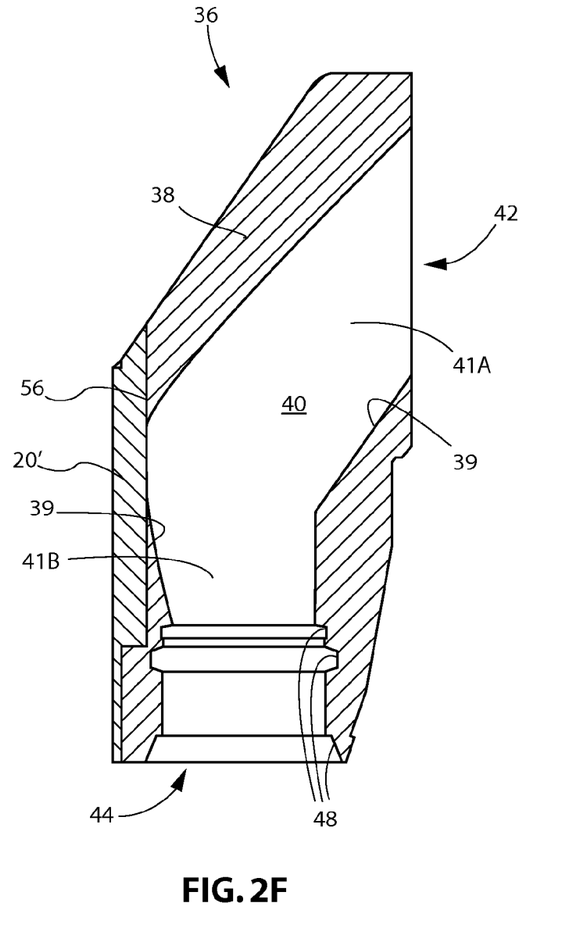
FIG. 2F is a longitudinal cross-sectional view (like that of FIG. 2D) of the flow tube shown in FIGS. 2A-2E illustrating erosion of the interior walls of the flow tube that may occur during drilling due to the flow of drilling fluid through the flow tube.

FIG. 2F is a longitudinal cross-sectional view of the flow tube 36, like that of FIG. 2D, illustrating erosion of the inner walls 39 of the tube body 38 of the flow tube 36 that may occur after causing drilling fluid to flow through the flow tube 36 for a period of time during drilling. As shown in FIG. 2F, the inner walls 39 of the tube body 38 within the fluid passageway 40 may erode until the relatively thick layer of hardfacing 20' is exposed within the fluid passageway 40. The hardfacing 20' may wear due to erosion at a rate that is lower than the rate at which the material of the tube body 38 of the flow tube 36 wears due to erosion. Therefore, the hardfacing 20' may prevent the drilling fluid from eroding entirely through the walls of the flow tube 36 from the interior fluid passageway 40 as quickly as in previously known flow tubes, thereby allowing embodiments of flow tubes 36 of the present invention to properly function for longer periods of time and through the operational life of the drill bit 10.

By way of example and not limitation, the hardfacing 20 and the hardfacing 20' each may comprise a composite material comprising a relatively hard first phase distributed within a second, continuous matrix phase. By way of example and not limitation, the first phase may comprise a hard material such as diamond, boron carbide, boron nitride, aluminum nitride, and carbides or borides of the group consisting of W, Ti, Mo, Nb, V, Hf, Zr, Si, Ta, and Cr and the matrix phase may comprise cobalt, a cobalt-based alloy, iron, an iron-based alloy, nickel, a nickel-based alloy, a cobalt and nickel-based alloy, an iron and nickel-based alloy, an iron and cobalt-based alloy, an aluminum-based alloy, a copper-based alloy, a magnesium-based alloy, or a titanium-based alloy. In some embodiments, the first phase may comprise a plurality of discrete regions or particles dispersed within the matrix phase. In other embodiments, the first phase may comprise a fabric structure that has been infiltrated with the matrix material, as discussed in further detail below.

In some embodiments, the hardfacing 20 and the harfacing 20' may have identical or similar compositions. In other embodiments, however, the material composition of the hardfacing 20 may differ from the material composition of the hardfacing 20'. For example, in the embodiment described above with reference to FIGS. 2A-2F, the hardfacing 20 applied to the rotationally leading and trailing outer edges 50, 52 of the flow tube 36 may be intended primarily to reduce wear caused by abrasion, while at least a portion of the hardfacing 20' may be intended primarily to reduce wear caused by erosion. Abrasion and erosion are two different wear mechanisms, and some material compositions have better resistance to abrasive wear, while other material compositions have better resistance to erosive wear. Therefore, the hardfacing 20' may have a material composition that exhibits increased erosion resistance relative to the hardfacing 20, while the hardfacing 20 may have a material composition that exhibits increased abrasion resistance relative to the hardfacing 20' in some embodiments of the present invention.

Referring to FIG. 2E, in some embodiments, the relatively thick layer of hardfacing 20' optionally may comprise a multilayer structure having different layers that exhibit one or more differing physical properties. By way of example and not limitation, the relatively thick layer of hardfacing 20' may comprise a radially inward first layer 20A' having a material composition tailored to exhibit enhanced resistance to erosion, and a radially outward second layer 20B' having a material composition tailored to exhibit enhanced resistance to abrasion. In other words, the first layer 20A' may exhibit an erosion resistance that is greater than an erosion resistance exhibited by the second layer 20B', and the second layer 20B' may exhibit an abrasion resistance that is greater than an abrasion resistance that is exhibited by the first layer 20A'. As one particular non-limiting example, the first layer 20A' of the hardfacing 20' may substantially fill the recess 56 formed in the outer surface of the tube body 38 of the flow tube 36, and the second layer 20B' of the hardfacing 20' may have a material composition identical to that of the hardfacing 20 applied to the rotationally leading and trailing outer edges 50, 52 of the flow tube 36. Furthermore, the second layer 20B' of the hardfacing 20' may be integrally formed with the hardfacing 20 applied to the rotationally leading and trailing outer edges 50, 52 of the flow tube 36.

Figure 3A:
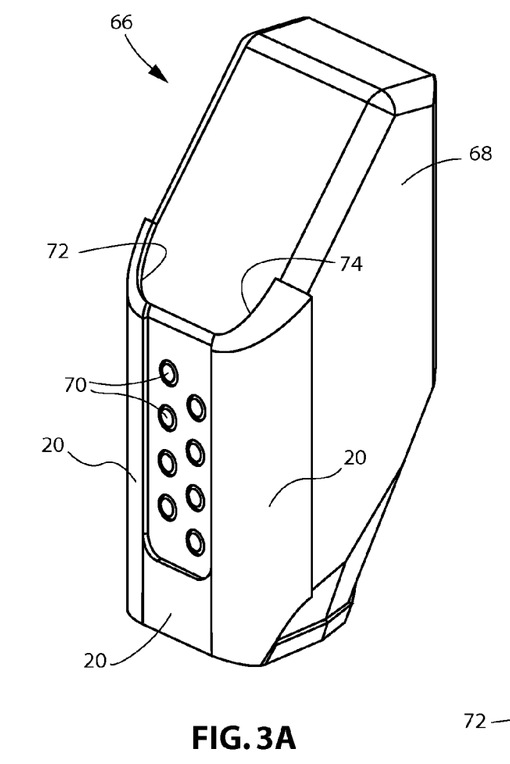
FIG. 3A is an isometric view of another embodiment of a flow tube according to the present invention that may be used with earth-boring tools, such as the rotary drill bit shown in FIG. 1.
Figure 3B:
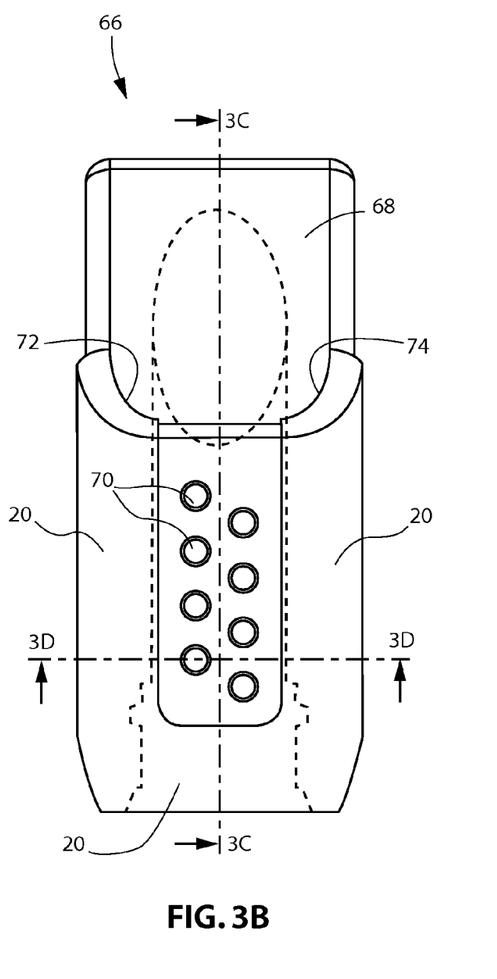
FIG. 3B is a front view of the flow tube shown in FIG. 3A.
Figure 3C:
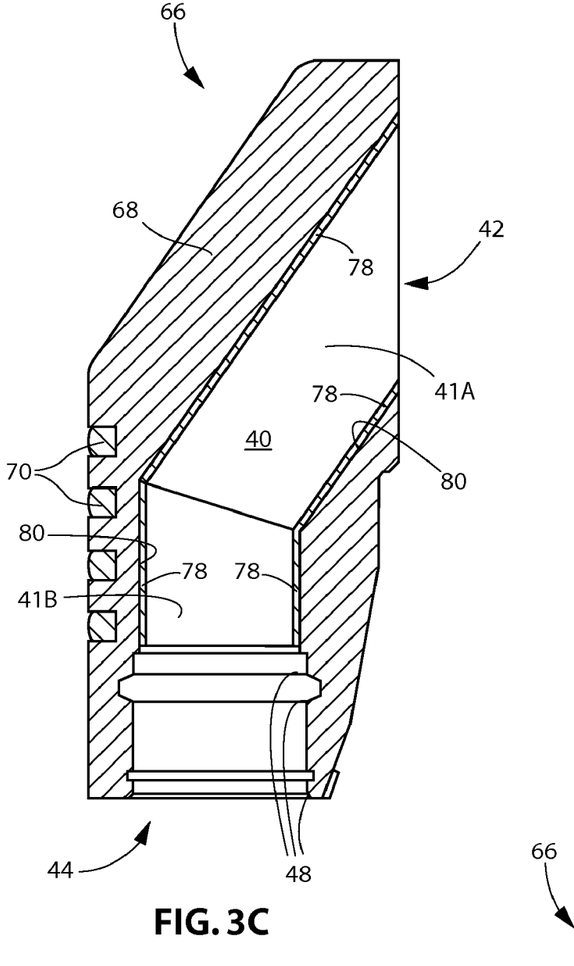
FIG. 3C is a longitudinal cross-sectional view of the flow tube shown in FIGS. 3A and 3B taken along section line 3C-3C shown in FIG. 3B.
Figure 3D:
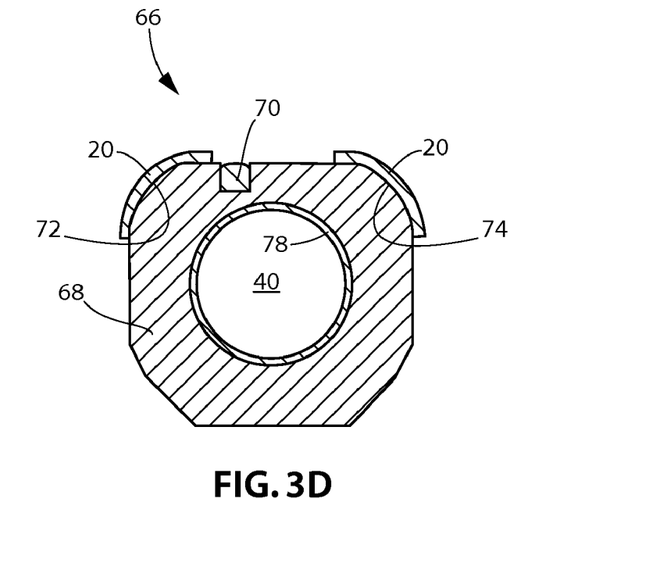
FIG. 3D is a transverse cross-sectional view of the flow tube shown in FIGS. 3A-3C taken along section line 3D-3D shown in FIG. 3B.

FIGS. 3A-3D illustrate another example embodiment of a flow tube 66 of the present invention that may be used with embodiments of earth-boring tools of the present invention, such as the rotary drill bit 10 shown in FIG. 1. In other words, the drill bit 10 shown in FIG. 1 may comprise flow tubes 66 in place of, or in addition to, the previously described flow tubes 36. FIG. 3A is an isometric view of the flow tube 66 and FIG. 3B is a front view of the flow tube 66. FIG. 3C is a longitudinal cross-sectional view of the flow tube 66 taken along section line 3C-3C of FIG. 3B, and FIG. 3D is a transverse cross-sectional view of the flow tube 66 taken along section line 3D-3D of FIG. 3B.

Referring to FIG. 3A, the flow tube 66 includes a tube body 68 that is generally similar to the previously described tube body 38 of the flow tube 36, and includes a fluid passageway 40 that extends through the tube body 68 of the flow tube 66 from an inlet 42 to an outlet 44 (FIG. 3C). Furthermore, hardfacing 20 may be applied to rotationally leading and trailing outer edges 72, 74 of the flow tube 66. The tube body 68 of the flow tube 66, however, may not include a recess 56 (FIG. 2D), and the flow tube 66 may include a plurality of wear-resistant inserts 70 instead of a relatively thick layer of hardfacing 20', as previously described with reference to the flow tube 36. The wear-resistant inserts 70 may be effective at reducing abrasive wear to the outer surface of the tube body 68 of the flow tubes 66. The wear-resistant inserts 70, however, may be relatively less effective (relative to the previously described layer of hardfacing 20' (FIG. 2D)) at reducing erosive wear to the tube body 68 caused by the flow of drilling fluid through the fluid passageway 40.

Referring to FIG. 3C, a hardfacing material 78 may be applied to at least a portion of the inner walls 80 of the tube body 68 the flow tube 66 within the fluid passageway 40. The hardfacing material 78 may be used to reduce erosive wear to the tube body 68 caused by the flow of drilling fluid through the fluid passageway 40. In some embodiments, the hardfacing material 78 may be applied to and cover substantially all inner walls 80 of the tube body 68 of the flow tube 66 that are exposed within the fluid passageway 40 after securing a nozzle (not shown) therein. In other embodiments, the hardfacing material 78 may be applied only to regions of the inner walls 80 that are susceptible to erosion, such as the regions of the inner walls 80 at which drilling fluid will impinge on the inner walls at acute angles as drilling fluid is pumped through the flow tube 66.

By way of example and not limitation, the layer of hardfacing material 78 applied to the inner walls 80 of the tube body 68 may have an average thickness of between about 1.25 millimeters (0.05 inch) and about 20 millimeters (0.8 inch).

By way of example and not limitation, the hardfacing material 78, like the hardfacing material 20' previously described herein, may comprise a composite material comprising a relatively hard first phase distributed within a second, continuous matrix phase. By way of example and not limitation, the first phase may comprise a hard material such as diamond, boron carbide, boron nitride, aluminum nitride, and carbides or borides of the group consisting of W, Ti, Mo, Nb, V, Hf, Zr, Si, Ta, and Cr, and the matrix phase may comprise cobalt, a cobalt-based alloy, iron an iron-based alloy, nickel, a nickel-based alloy, a cobalt and nickel-based alloy, an iron and nickel-based alloy, an iron and cobalt-based alloy, an aluminum-based alloy, a copper-based alloy, a magnesium-based alloy, or a titanium-based alloy. In some embodiments, the first phase may comprise a plurality of discrete regions or particles dispersed within the matrix phase.

In additional embodiments, the hardfacing material 78 may comprise a brazed composite cladding comprising wherein the first phase is formed from a fabric (e.g., a tungsten carbide fabric material) and the fabric is embedded within a metal or metal alloy matrix phase that has infiltrated the fabric in a brazing process. By way of example and not limitation, a cloth or fabric comprising carbide material (e.g., tungsten carbide) may be applied to selected surfaces of the inner walls 80 of the tube body 68 of the flow tube 66 using a low temperature adhesive. A second layer of material containing the metal or metal alloy matrix material may be applied over the carbide material. The resulting structure then may be heated to a temperature above the melting point of the matrix material, causing the matrix material to melt and the molten matrix material to be wicked into the tungsten carbide fabric, metallurgically bonding the tungsten carbide material to the inner walls 80 of the tube body 68 of the flow tube 66 and forming the hardfacing material 78. Alternatively, a single cloth or fabric that includes both a carbide material and a metal or metal alloy matrix material may be used to apply the hardfacing material 78 to selected surfaces of the inner walls 80 of the tube body 68 of the flow tube 66. Such materials are commercially available from, for example, Conforma Clad, Inc. of New Albany, Ind.

In other embodiments, the hardfacing material 78 may comprise a plurality of hard particles dispersed within a metal or metal alloy matrix material, and may have a material composition tailored to exhibit enhanced erosion resistance. Such hardfacing materials 78 may be applied using, for example, flame spray techniques and welding techniques such as oxy-acetylene, metal inert gas (MIG), tungsten inert gas (TIG), and plasma transferred arc welding (PTAW) techniques.

In additional embodiments of the invention flow tubes may be provided that include both a relatively thick layer of hardfacing 20' as previously disclosed in relation to FIGS. 2A-2F and a hardfacing material 78 applied to at least a portion of an inner wall of a body within a fluid passageway, as previously disclosed in relation to FIGS. 3A-3D.

Although the flow tubes 36 previously described in relation to FIGS. 2A-2F and the flow tube 66 previously described in relation to FIGS. 3A-3D are illustrated as comprising separate bodies that are attached to a bit body (or one bit leg or bit head section of a bit body) by, for example, welding, additional embodiments of the present invention may comprise flow tubes that are integrally formed with (and are an integral portion of a bit body (or one bit leg or a bit head section of a bit body), as well as earth-boring tools having such integrally formed flow tubes or fluid passageways.

While the present invention has been described herein with respect to certain preferred embodiments, those of ordinary skill in the art will recognize and appreciate that it is not so limited. Rather, many additions, deletions and modifications to the preferred embodiments may be made without departing from the scope of the invention as hereinafter claimed. In addition, features from one embodiment may be combined with features of another embodiment while still being encompassed within the scope of the invention as contemplated by the inventors. Further, the invention has utility with different and various bit profiles as well as cutting element types and configurations.

What is claimed is:

1. A flow tube for an earth-boring tool, comprising:
    a tube body having at least one inner surface defining a fluid passageway extending through the tube body from an inlet to an outlet;
    a recess in an outer surface of the tube body in a region of the tube body susceptible to erosion when fluid is caused to flow through the fluid passageway from the inlet to the outlet, wherein the recess comprises a groove extending longitudinally along the outer surface of the tube body; and
    a hardfacing material applied to a surface of the tube body in the region of the tube body susceptible to erosion when fluid is caused to flow through the fluid passageway from the inlet to the outlet, wherein at least a portion of the hardfacing material is at least partially disposed within the recess.

2. The flow tube of claim 1, wherein at least a portion of the hardfacing material is located proximate a region of the inner surface of the tube body at which fluid impinges on the inner surface at an acute angle when fluid flows through the fluid passageway from the inlet to the outlet.

3. The flow tube of claim 1, wherein the at least a portion of the hardfacing material disposed at least partially within the recess is exposed within the fluid passageway.

4. The flow tube of claim 1, wherein the at least a portion of the hardfacing material disposed at least partially within the recess comprises a first inner layer of hardfacing material having a first material composition disposed within the recess and a second outer layer of hardfacing material disposed on a side of the first inner layer opposite the tube body and having a different, second material composition, the first inner layer of hardfacing material exhibiting a greater resistance to erosion than the second outer layer of hardfacing material.

5. The flow tube of claim 1, wherein the hardfacing material covers at least a portion of the at least one inner surface of the tube body within the fluid passageway.

6. The flow tube of claim 5, wherein the hardfacing material covers substantially all exposed surfaces of the at least one inner surface within the fluid passageway.

7. The flow tube of claim 6, wherein the hardfacing material comprises a composite cladding material, the composite cladding material comprising a first fabric phase within a second, continuous matrix phase.

8. The flow tube of claim 1, wherein the hardfacing material comprises a plurality of hard particles dispersed within a metal or metal alloy binder material.

9. The flow tube of claim 1, wherein the hardfacing material comprises a composite cladding material, the composite cladding material comprising a first fabric phase within a second, continuous matrix phase.

10. An earth-boring tool, comprising:
a tool body having at least one cutting structure mounted thereto;
a fluid passageway extending through at least a portion of the tool body;
a hardfacing material covering a surface of the tool body in a region of the tool body susceptible to erosion from fluid when the fluid is caused to flow through the fluid passageway; and
a recess in an outer surface of the tool body proximate to the region of the tool body susceptible to erosion from fluid when fluid is caused to flow through the fluid passageway, wherein the recess comprises a groove extending longitudinally along the outer surface of the tool body, and at least a portion of the hardfacing material being disposed at least partially within the recess.

11. The earth-boring tool of claim 10, wherein the earth-boring tool comprises a rotary drill bit.

12. The earth-boring tool of claim 11, wherein the at least one cutting structure comprises a roller cone rotatably mounted to the tool body, the roller cone comprising a plurality of cutting elements on an outer surface thereof.

13. The earth-boring tool of claim 12, wherein the tool body comprises a bit body and a flow tube body attached to the bit body, and the hardfacing material covers a surface of the flow tube body.

14. The earth-boring tool of claim 10, wherein the recess extends into the outer surface of the tube body to a depth of between about 5.0 millimeters and about 13.0 millimeters.

15. The earth-boring tool of claim 10, wherein a region of an inner surface of the tool body is at least partially disposed at a location at which fluid impinges on the inner surface at an acute angle thereto when fluid flows through the fluid passageway.

16. The earth-boring tool of claim 10, wherein the hardfacing material comprises a plurality of hard particles dispersed within a metal or metal alloy binder material.

17. The earth-boring tool of claim 10, wherein the at least a portion of the hardfacing material disposed at least partially within the recess is exposed within the fluid passageway.

18. The earth-boring tool of claim 10, wherein the at least a portion of the hardfacing material disposed at least partially within the recess comprises a first inner layer of hardfacing material having a first material composition disposed within the recess and a second outer layer of hardfacing material disposed on a side of the first inner layer opposite the tool body and having a different, second material composition, the first layer of hardfacing material exhibiting a greater resistance to erosion than the second layer of hardfacing material.

19. The earth-boring tool of claim 10, wherein the hardfacing material covers at least a portion of at least one inner surface of the tool body within the fluid passageway.

20. The earth-boring tool of claim 19, wherein the hardfacing material comprises a composite cladding material, the composite cladding material comprising a first fabric phase within a second, continuous matrix phase.

21. An earth-boring tool comprising:
a body having at least one cutting structure secured thereto;
a fluid passageway extending through at least a portion of the body;
a recess in an outer surface of the body in a region of the body susceptible to erosion when fluid is caused to flow through the fluid passageway; and
a mass of hardfacing material covering at least a portion of an outer surface of the body, at least a portion of the mass of hardfacing material at least partially disposed within the recess, and at least a portion of the mass of hardfacing material disposed at least partially within the recess extending through the body from the outer surface of the body to an inner surface of the body within the fluid passageway.

22. A method of forming an earth-boring tool, the method comprising:
forming a body having a fluid passageway extending therethrough;
securing at least one cutting structure to the body;
forming a recess comprising a longitudinally extending groove in an outer surface of the body proximate to a region of an inner surface of the body within the fluid passageway susceptible to erosion from fluid when the fluid is caused to flow through the fluid passageway;
covering at least a portion of a surface of the body with a hardfacing material, the at least a portion of the surface of the body being located in a region of the body susceptible to erosion from fluid when the fluid is caused to flow through the fluid passageway; and
disposing at least a portion of the hardfacing material at least partially within the recess.

23. The method of claim 22, wherein disposing at least a portion of the hardfacing material at least partially within the recess comprises:
disposing a first hardfacing material having a first composition within the recess; and
disposing a second hardfacing material having a second composition over the first hardfacing material and at least a portion of the outer surface of the body.

24. The method of claim 22, wherein covering the surface of the body with the hardfacing material comprises covering at least a portion of an inner surface of the body within the fluid passageway with the hardfacing material.

25. A flow tube for an earth-boring tool, comprising:
a tube body having at least one inner surface defining a fluid passageway extending through the tube body from an inlet to an outlet;
a recess in an outer surface of the tube body in a region of the tube body susceptible to erosion when fluid is caused to flow through the fluid passageway from the inlet to the outlet;
a hardfacing material applied to a surface of the tube body in the region of the tube body susceptible to erosion when fluid is caused to flow through the fluid passageway from the inlet to the outlet, wherein at least a portion of the hardfacing material is at least partially disposed within the recess; and
wherein the at least a portion of the hardfacing material disposed at least partially within the recess is exposed within the fluid passageway.

* * * * *